United States Patent
Ki et al.

(10) Patent No.: US 8,345,810 B2
(45) Date of Patent: Jan. 1, 2013

(54) EQUALIZER BASED RECEIVER OPERATION METHOD AND APPARATUS IN A MOBILE COMMUNICATION SYSTEM

(75) Inventors: Young-Min Ki, Suwon-si (KR); Seong-Wook Song, Gwacheon-si (KR); Hun-Kee Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 836 days.

(21) Appl. No.: 12/473,912

(22) Filed: May 28, 2009

(65) Prior Publication Data

US 2009/0304063 A1 Dec. 10, 2009

(30) Foreign Application Priority Data

Jun. 4, 2008 (KR) ........................ 10-2008-0052388

(51) Int. Cl.
*H03K 5/159* (2006.01)

(52) U.S. Cl. ........................................ 375/350; 375/232
(58) Field of Classification Search .................. 375/229, 375/230, 232, 234, 235, 249, 250, E1.004, 375/E1.014, E1.032, E1.046
See application file for complete search history.

(56) References Cited

U.S. PATENT DOCUMENTS

| | | | | |
|---|---|---|---|---|
| 5,970,084 A | * | 10/1999 | Honda | 375/147 |
| 6,285,768 B1 | * | 9/2001 | Ikeda | 381/71.11 |
| 2003/0157892 A1 | * | 8/2003 | Reznik et al. | 455/65 |
| 2006/0171451 A1 | * | 8/2006 | Pietraski et al. | 375/232 |

\* cited by examiner

*Primary Examiner* — David C. Payne
*Assistant Examiner* — Wednel Cadeau
(74) *Attorney, Agent, or Firm* — Jefferson IP Law, LLP (57) ABSTRACT

An equalizer based receiver operation method and apparatus in a mobile communication system are provided. The method includes estimating a channel for a multi path receive signal, analyzing a delay profile of a multi path channel, and selecting a tap position from a plurality of tap positions of an equalizer depending on the analyzed delay profile.

12 Claims, 9 Drawing Sheets

EQUALIZER BASED RECEIVER OPERATION METHOD AND APPARATUS IN A MOBILE COMMUNICATION SYSTEM

PRIORITY

This application claims the benefit under 35 U.S.C. §119(a) of a Korean patent application filed in the Korean Intellectual Property Office on Jun. 4, 2008 and assigned Serial No. 10-2008-0052388, the entire disclosure of which is hereby incorporated by reference.

BACKGROUND OF THE INVENTION

1. Field of the Invention

The present invention relates to an equalizer based receiver operation method and apparatus in a mobile communication system. More particularly, the present invention relates to a receiver operation method and apparatus for adaptively changing a position of a channel estimation tap and equalizer tap considering a delay profile of a multi path channel.

2. Description of the Related Art

In recent years, as mobile communication systems providing high-speed data transmission, such as a Wideband Code Division Multiple Access (WCDMA) system and a High Speed Downlink Packet Access (HSDPA) system, are being standardized and commercialized, research on an equalizer based receiver that is suitable for high speed reception is being actively conducted.

The conventional equalizer based receiver includes a multi-tap channel estimator having a tap that provides sufficient duration to receive a delay profile of a receive channel and an equalizer. A multi tap channel estimator having a tap of sufficient length as described above is a structure designed for a worst case scenario in which a delay profile of a multi path receive channel may be long but, in reality, the long delay profile does not always appear in every channel reception environment.

Accordingly, in the conventional art, a technique of selectively using a multi tap having a long length depending on a channel environment is provided. That is, a technique of estimating a delay profile of a receive signal depending on a multi path, locking only a necessary tap, among a plurality of taps, having a long length, unlocking remaining taps, and receiving a signal in a receiver is provided. The technique of locking and using only a necessary tap has an advantage of being capable of reducing power consumption by only using hardware when required by certain conditions and being capable of eliminating a performance loss appearing when locking a tap of no multi path energy.

However, the technique of selecting and using only one tap among a plurality of taps as described above has a fundamental disadvantage of still requiring a multi tap of sufficient length to ensure performance for all conditions. Also, because a receiver has a multi tap based on a fixed position, a delay profile of a multi path channel may be out of a multi tap range of the receiver due to a high speed movement of a Mobile Station (MS). Thus, there is a problem that performance may be lost. For example, in the case of the receiver selecting a tap based on a fixed position, after a time lapse, a position of a delay profile of a multi path channel may be out of a range of the selected tap and thus, the energy of a receive signal that is out of range is reduced and a corresponding performance loss occurs. The above performance loss can be addressed by designing a multi tap of a channel estimator with greater duration, but such a design causes a problem of increasing a size of hardware and complexity. Accordingly, there is a need to provide an improved equalizer based receiver operation method and apparatus in a mobile communication system.

SUMMARY OF THE INVENTION

An aspect of the present invention is to address at least the above mentioned problems and/or disadvantages and to provide at least the advantages described below. Accordingly, an aspect of the present invention is to provide an equalizer based receiver operation method and apparatus in a mobile communication system.

Another aspect of the present invention is to provide a method and apparatus for decreasing a size of a multi tap and reducing hardware complexity in an equalizer based receiver of a mobile communication system.

A further aspect of the present invention is to provide a receiver operation method and apparatus for adaptively changing a position of a channel estimation tap and equalizer tap considering a delay profile of a multi path channel in a mobile communication system.

Yet another aspect of the present invention is to provide a receiver operation method and apparatus for slewing a position of a multi tap and tracking a change of a delay profile in a mobile communication system.

The above aspects are achieved by providing an equalizer based receiver operation method and apparatus in a mobile communication system.

In accordance with an aspect of the present invention, an equalizer based receiver operation method in a mobile communication system is provided. The method includes estimating a channel for a multi path receive signal, analyzing a delay profile of a multi path channel, and selecting a tap position from a plurality of tap positions of an equalizer depending on the analyzed delay profile.

In accordance with another aspect of the present invention, an equalizer based receiver apparatus in a mobile communication system is provided. The apparatus includes a channel estimator for estimating a channel for a multi path receive signal, for analyzing a delay profile of a multi path channel, and for selecting a tap position from a plurality of tap positions depending on the analyzed delay profile result, and an equalizer for compensating a distortion of the multi path receive signal using the multi tap of the changed position.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

A technology for adaptively changing a position of a channel estimation tap and equalizer tap considering a delay profile of a multi path channel in a receiver of a mobile communication system according to the present invention is described below.

Figure 1:
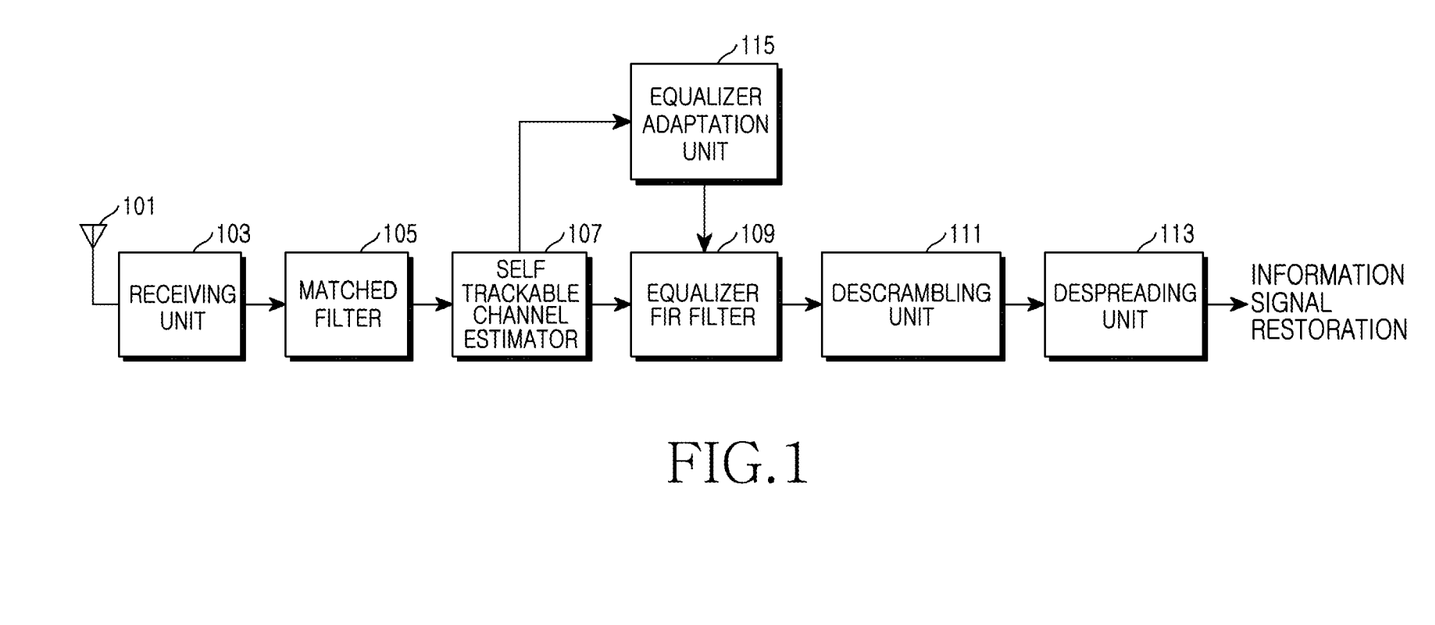
FIG. 1 is a block diagram illustrating a construction of a receiver in a mobile communication system according to an exemplary embodiment of the present invention.

FIG. 1 is a block diagram illustrating a construction of a receiver in a mobile communication system according to an exemplary embodiment of the present invention.

Referring to FIG. 1, the receiver includes an antenna 101, a receiving unit 103, a matched filter 105, a self trackable channel estimator 107, an equalizer Finite Impulse Response (FIR) filter 109, a descrambling unit 111, a despreading unit 113, and an equalizer adaptation unit 115.

The matched filter 105 performs matched filtering between a signal, received through the antenna 101 and the receiving unit 103, and a previously stored reference signal and provides the result to the self trackable channel estimator 107.

The self trackable channel estimator 107 despreads a signal using previously stored knowledge of a transmission pattern such as a pilot signal and then estimates a channel using a correlation with an original data signal. More particularly, the self trackable channel estimator 107 estimates a tap position most suitable for a receive signal suffering a multi path channel delay. An exemplary self trackable channel estimator 107 is described below in more detail with reference to FIG. 2.

The equalizer FIR filter 109 performs an equalizer operation depending on an equalizer tap gain provided from the equalizer adaptation unit 115, compensates for distortion of a multi path receive signal provided from the self trackable channel estimator 107, and provides the result to the descrambling unit 111.

The descrambling unit 111 descrambles the compensated signal and provides the result to the despreading unit 113. The despreading unit 113 despreads the signal from the descrambling unit 111.

The equalizer adaptation unit 115 operates an equalizer tap gain using a multi tap estimated in the self trackable channel estimator 107, and provides the result to the equalizer FIR filter 109.

Figure 2:
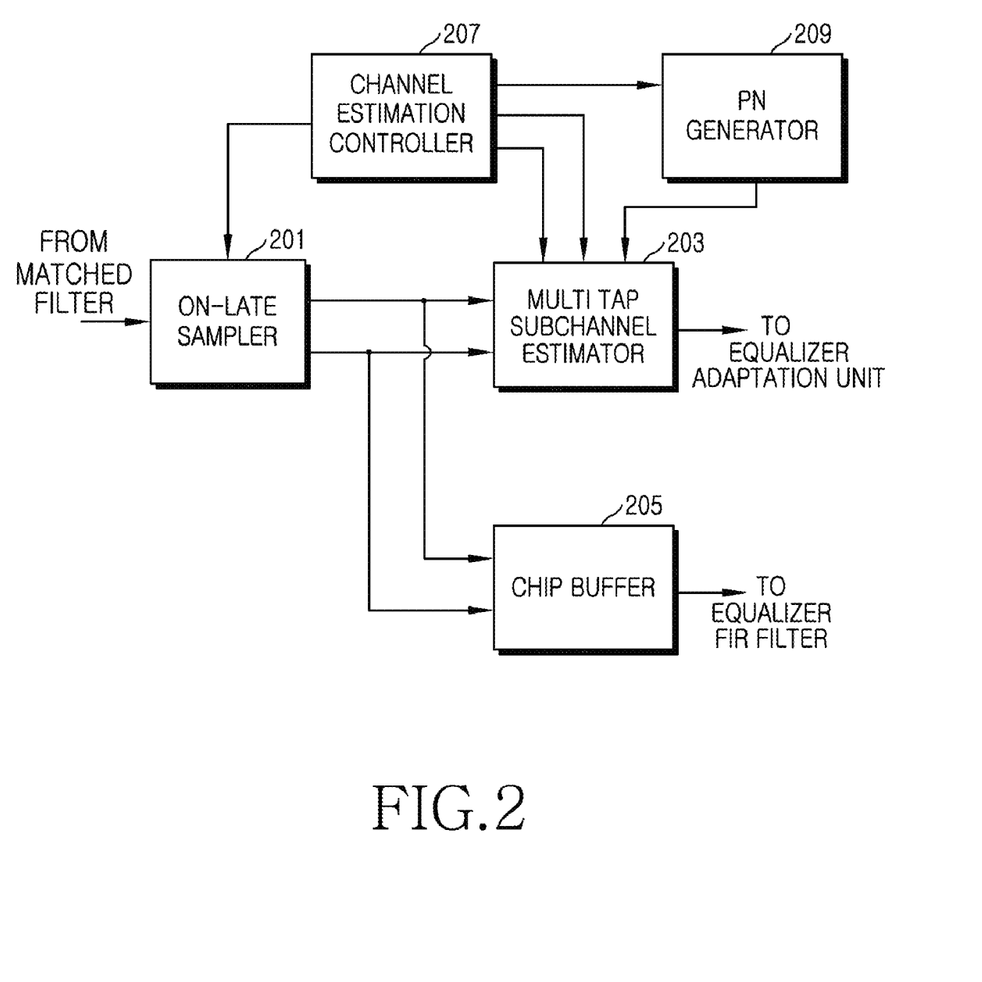
FIG. 2 is a block diagram illustrating a construction of a self trackable channel estimator in a receiver according to an exemplary embodiment of the present invention.

FIG. 2 is a block diagram illustrating a construction of a self trackable channel estimator in a receiver according to an exemplary embodiment of the present invention.

Referring to FIG. 2, the self trackable channel estimator includes an on-late sampler 201, a multi-tap subchannel estimator 203, a chip buffer 205, a channel estimation controller 207, and a Pseudo-random Noise (PN) generator 209.

The on-late sampler 201 performs sampling on a 2× chip rate signal provided from the matched filter 105, generates an on-sample and late-sample that is a 1× chip rate signal, and provides the on-sample and late-sample to both the multi-tap subchannel estimator 203 and the chip buffer 205. More particularly, the on-late sampler 201 controls an output of the on-sample and late-sample depending on a slewing signal input from the channel estimation controller 207.

Figure 3:
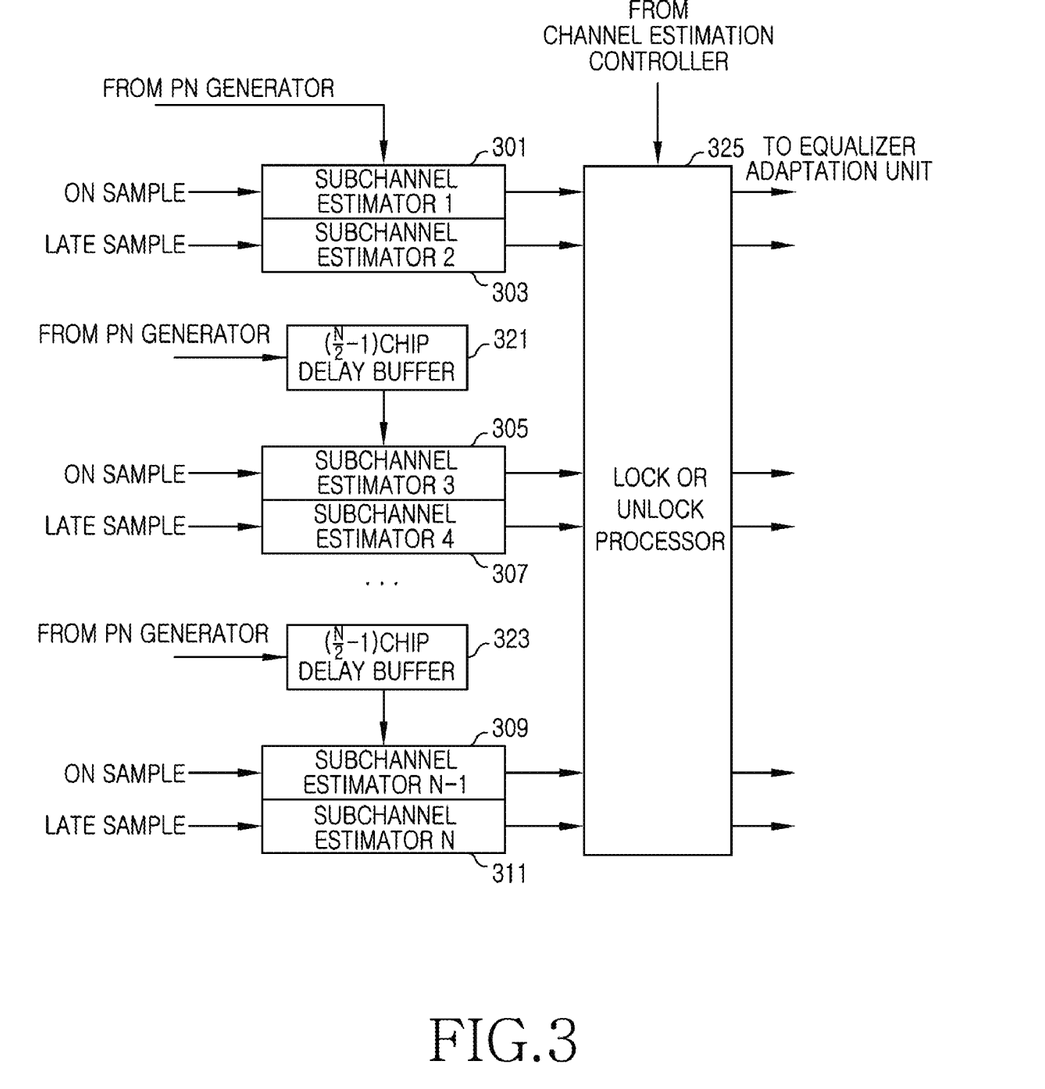
FIG. 3 is a block diagram illustrating a detailed construction of a multi tap subchannel estimator in a self trackable channel estimator according to an exemplary embodiment of the present invention.

The multi-tap subchannel estimator 203 performs parallel channel estimation for 'N' number of continuous taps having a delay time difference of a half chip interval. That is, as illustrated in FIG. 3, the multi-tap subchannel estimator 203 acquires a channel estimation value for determining a tap setting using an on/late-sample and a PN signal (or a PN code), by including 'N' number of parallel subchannel estimators 301, 303, 305, 307, 309, and 311. Here, the number 'N' corresponds to the number of taps. Among the 'N' number of sub channel estimators 301, 303, 305, 307, 309, and 311, the odd-numbered subchannel estimators 301, 305, and 309 receive on-samples, and the even-numbered subchannel estimators 303, 307, and 311 receive late-samples. Also, the multi-tap subchannel estimator 203 includes a plurality of delay buffers 321 and 323 and thus delays a PN signal input from the PN generator 209 by a predefined chip and inputs the result to the respective subchannel estimators 301, 303, 305, 307, 309, and 311. At this time, Each of the delay buffers 321 and 323 delay the PN signals by a (N/2−1) chip such that the PN signals are input having a difference of a delay time by one chip every two subchannel estimators.

The multi-tap subchannel estimator 203 acquires a channel estimation value for 'N' number of taps, having a half chip interval, through the 'N' number of subchannel estimators, provides the result to the channel estimation controller 207, processes to lock and unlock each tap through a lock and unlock processor 325 depending on lock information from the channel estimation controller 207, and provides the result to the equalizer adaptation unit 115.

The chip buffer 205 uses a First Input First Output (FIFO) form for stacking an on-sample and a late-sample received from the on-late sampler 201 in regular sequence and for outputting the result in the regular sequence. The chip buffer 205 performs a function of buffering and outputting a data signal during a predefined delay time such that an equalizer tap gain of the equalizer adaptation unit 115 and a data signal of the on/late-sample are input to the equalizer FIR filter 109 with the same timing.

Figure 4:
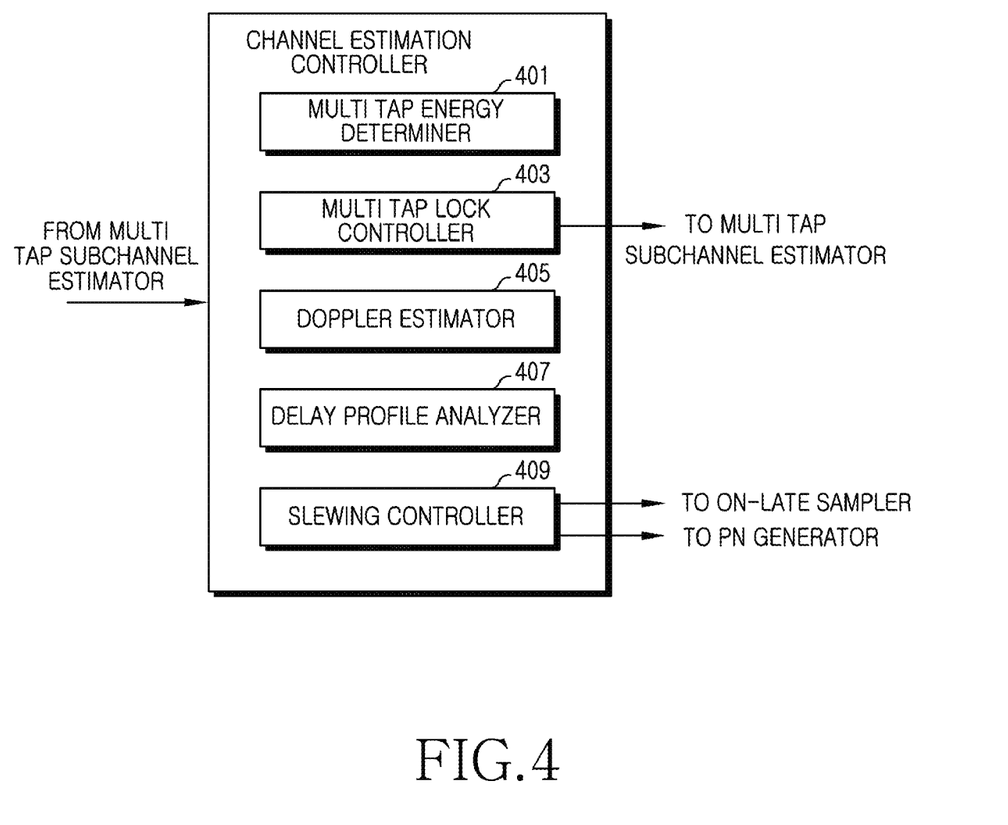
FIG. 4 is a block diagram illustrating a construction of a channel estimation controller in a self trackable channel estimator according to an exemplary embodiment of the present invention.

The channel estimation controller 207 receives inputs of the estimated channel values from the multi-tap subchannel estimator 203, analyzes a channel characteristic, and performs an operation of multi tap energy determination, multi tap lock control, Doppler estimation, delay profile analysis, and slewing control. For this, as illustrated in FIG. 4, the channel estimation controller 207 may include a multi tap energy determiner 401, a multi tap lock controller 403, a Doppler estimator 405, a delay profile analyzer 407, and a slewing controller 409.

The multi tap energy determiner 401 continuously measures a time average power of a multi tap channel, and provides the result to the multi tap lock controller 403. The time average power for the multi tap channel may be determined using Equation 1 below:

$$P_n(t) = \frac{1}{N_T} \sum_{\tau=t-N_T+1}^{t} |h_n(\tau)|^2 \tag{1}$$

In Equation 1, '$P_n(t)$' represents a time average power value for an n-th channel tap, '$h_n(t)$' represents a channel estimation value for the n-th channel tap at time 't', 'N' represents the number of taps of the multi tap subchannel estimator 203, and '$N_T$' represents a window size for determining the time average power. Here, as the window size is increased, power is controlled based on a long-term power and, as the window size is decreased, power is controlled based on a short-term power. For example, if the window size is equal to '1', power is controlled based on an instantaneous power.

As given in Equation 2 below, the multi tap lock controller 403 determines a sum of a time average power of each channel tap determined in the multi tap energy determiner 401 and, as given in Equation 3 below, determines a lock threshold using the sum of the time average power value.

Equation 2 below represents a power sum at time 't'.

$$P_{tot}(t) = \sum_{n=1}^{N} P_n(t) \tag{2}$$

In Equation 2, '$P_{tot}(t)$' represents a total sum of a time average power at the time 't', '$P_n(t)$' represents a time average power value for an n-th channel tap, and 'N' represents the number of taps of the multi tap subchannel estimator 203.

Equation 3 below represents a lock threshold.

$$T_L = P_{tot}(t)/T_\alpha \tag{3}$$

In Equation 3, '$T_L$' represents a lock threshold, '$P_{tot}(t)$' represents a total sum of a time average power at time 't', and '$T_\alpha$' represents a lock threshold coefficient. The lock threshold coefficient depends on a Signal to Interference and Noise Ratio (SINR). That is, a high SINR environment locks as many taps as possible by decreasing a size of the lock threshold because an estimation value of a subchannel estimator is relatively accurate. A low SINR environment unlocks as many taps as possible by increasing the size of the lock threshold because an estimation value of the subchannel estimator includes a relatively high amount of noise.

The multi tap lock controller 403 determines to lock or unlock each multi tap as given in Equation 4 below and provides the result to the multi tap subchannel estimator 203.

$$Lock_n = \begin{cases} 1, & \text{if } P_n(t) > T_L \\ 0, & \text{otherwise} \end{cases} \tag{4}$$

In Equation 4, '1' represents locking a corresponding tap, and '0' represents unlocking a corresponding tap.

The Doppler estimator 405 operates a time correlation of a multi tap channel and, based on the time correlation, estimates a moving speed of a receiver MS, thereby generating a parameter for determining a filter coefficient of each subchannel estimator and a convergence speed of an equalizer FIR filter.

The delay profile analyzer 407 analyzes a multi path characteristic of a receive channel in an energy distribution and delay spread form using estimated multi tap channel values and determines a position (i.e., a maximum power position) having the maximum power value.

At this time, as given in Equation 5 below, the delay profile analyzer 407 analyzes a delay profile of a multi path channel using a moving average technique and, as given in Equation 6 below, determines the maximum power position.

$$MA_n(t) = \frac{1}{N_{MA}} \sum_{i=n}^{n+N_{MA}-1} P_i(t) \tag{5}$$

In Equation 5, '$MA_n(t)$' represents a moving average of an n-th channel tap at time 't', and '$N_{MA}$' represents a moving average window size for the n-th channel tap at the time 't' and is settable by a value less than the number (N) of channel taps. Also, '$P_n(t)$' represents a time average power value for the n-th channel tap.

$$n_{max}(t) = \underset{n}{\operatorname{argmax}} MA_n(t) \tag{6}$$

In Equation 6, '$n_{max}(t)$' represents the maximum power position and '$MA_n(t)$' represents a moving average of an n-th channel tap at time 't'.

The slewing controller 409 determines slewing or non-slewing by comparing the maximum power position determined in the delay profile analyzer 407 with a position (i.e., a reference position) of a previously allocated multi tap. If the maximum power position and the reference position are not substantially identical, i.e., if the multi path delay profile moves with time and becomes different from the position of the multi tap, the slewing controller 409 outputs a slewing control signal to move the maximum power position to a front or rear tap for consistency with the reference position.

The slewing controller 409 controls the on/late-sampler 201 and the PN generator 209 through the slewing control signal such that the multi path delay profile is distributed within the multi tap. Here, the slewing may include negative slewing and positive slewing. The negative slewing is to increase a phase of a PN code by one tap (i.e., a half chip) and make the phase consistent with a receive signal, and the positive slewing is to decrease the phase of the PN code by one tap (i.e., a half chip) and make the phase consistent with the receive signal. That is, the slewing controller 409 compares the maximum power position with the reference position, and determines slewing as given in Equation 7 below.

$$\text{Slew} = \begin{cases} -1, & \text{if } n_{max}(t) < n_{rej} \\ 1, & \text{if } n_{max}(t) > n_{rej} \\ 0, & \text{otherwise} \end{cases} \quad (7)$$

In Equation 7, '−1' represents negative slewing, '1' represents positive slewing, and '0' represents non-slewing. Also, '$n_{max}$' represents the maximum power position, and '$n_{ref}$' represents a reference position.

As given in Equation 7, if the maximum power position is greater than a reference position, the slewing controller 409 determines positive slewing, if the maximum power position is less than the reference position, determines negative slewing and, if the maximum power position and the reference position are substantially identical, determines non-slewing.

As described above, slewing control may be performed at a relatively low frequency or may be performed at a relatively high frequency depending on a size setting of a moving average window. For example, if a size of the moving average window increases, power of a relatively wide duration becomes a slewing determination reference and thus slewing is performed at a relatively low frequency. If the size of the moving average window decreases, power of a relatively narrow duration becomes a slewing determination reference and thus, the slewing is performed at a relatively high frequency. More particularly, if the size of the moving average window is set to '1', slewing is controlled on the basis of a movement of the maximum power tap.

The PN generator 209 generates and provides a PN signal, which includes a scrambling code necessary for despreading, an Orthogonal Variable Spreading Factor (OVSF) code, an antenna pattern, etc., to the multi tap subchannel estimator 203 such that the multi tap subchannel estimator 203 may restore a pilot signal. More particularly, according to an exemplary embodiment of the present invention, the PN generator 209 controls an output of the PN signal depending on a slewing signal input from the channel estimation controller 207.

Figure 5:
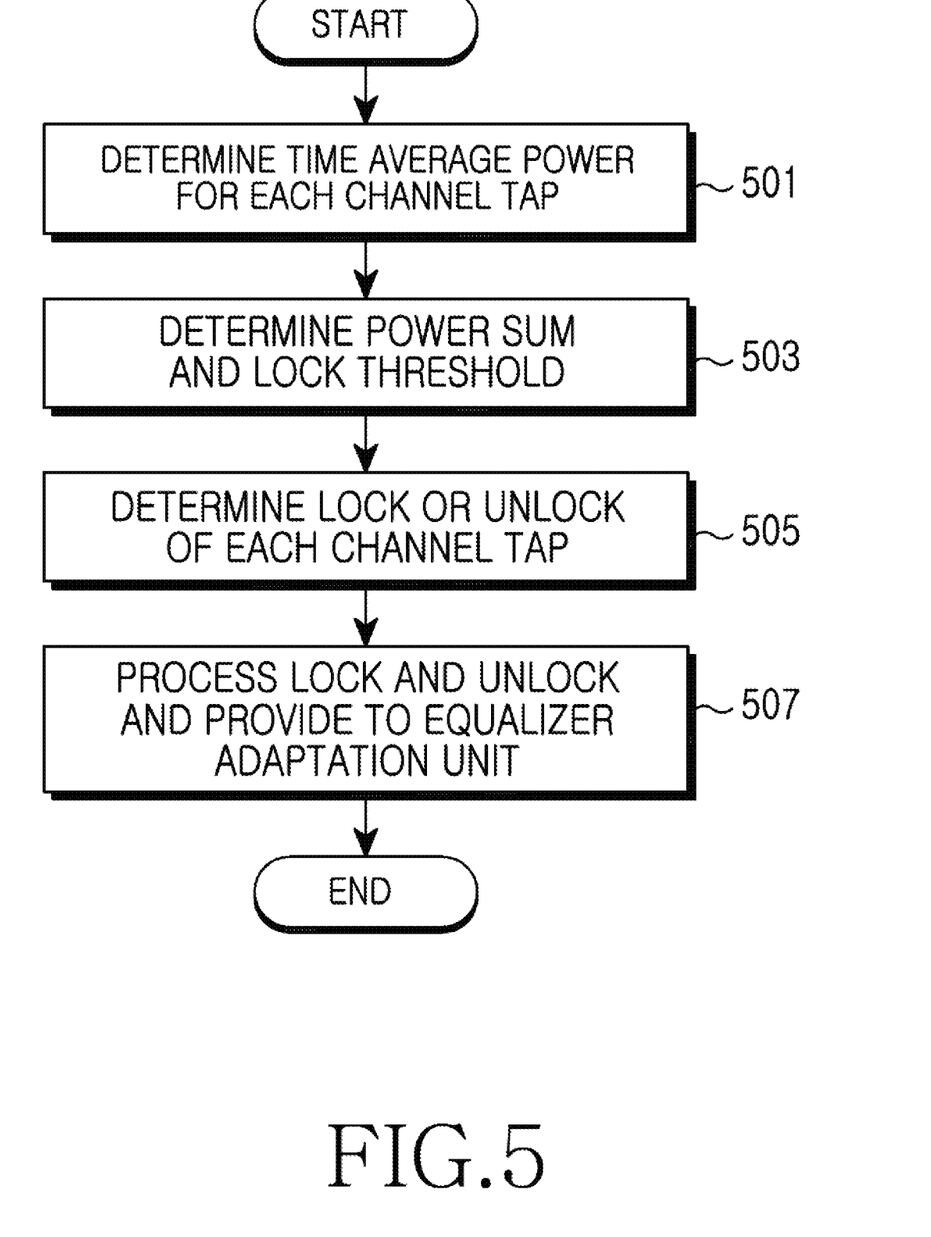
FIG. 5 is a flowchart illustrating a multi tap lock control operation procedure of a subchannel estimator in a receiver according to an exemplary embodiment of the present invention.

FIG. 5 is a flowchart illustrating a multi tap lock control operation procedure of a channel estimation controller in a receiver according to an exemplary embodiment of the present invention.

Referring to FIG. 5, in step 501, the channel estimation controller determines energy for each tap, i.e., a time average power as given in Equation 1. In step 503, the channel estimation controller determines a total sum of the time average power and a lock threshold depending thereon as given in Equations 2 and 3.

In step 505, the channel estimation controller determines to lock or unlock each tap as given in Equation 4. In step 507, the channel estimation controller locks or unlocks each tap and provides the result to an equalizer adaptation unit. Finally, the channel estimation controller terminates the operation according to an exemplary embodiment of the present invention.

Figure 6:
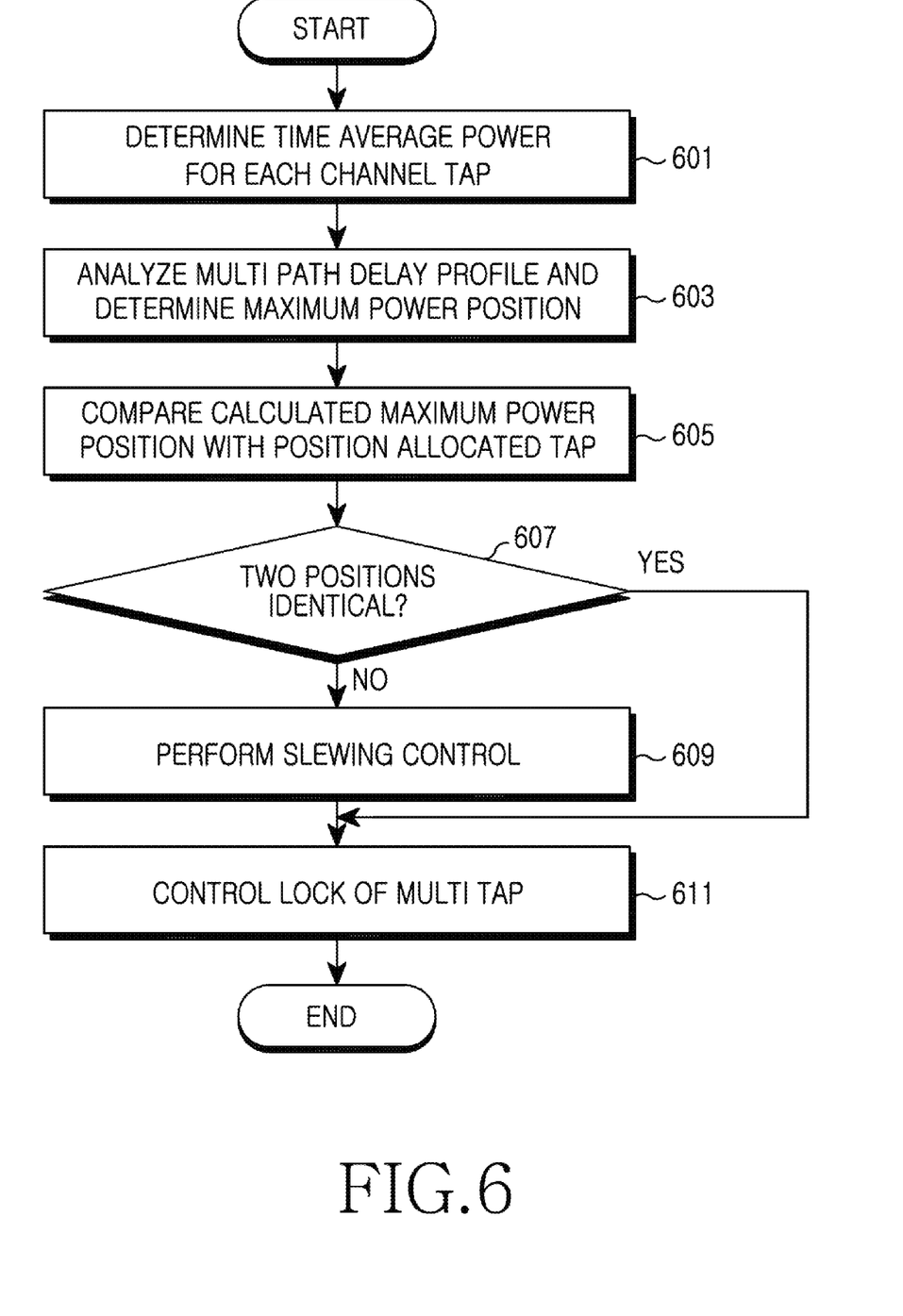
FIG. 6 is a flowchart illustrating a self trackable control operation procedure of a channel estimation controller in a receiver according to an exemplary embodiment of the present invention.

FIG. 6 is a flowchart illustrating a self trackable control operation procedure of a channel estimation controller in a receiver according to an exemplary embodiment of the present invention.

Referring to FIG. 6, in step 601, the channel estimation controller determines the energy for each tap, i.e., a time average power as given in Equation 1. In step 603, the channel estimation controller analyzes a multi path characteristic of a receive channel using estimated multi tap channel values in an energy distribution and delay spread form, and determines the maximum power position. At this time, as given in Equation 5, the channel estimation controller analyzes a delay profile of a multi path channel using a moving average technique and, as given in Equation 6, determines the maximum power position.

In step 605, the channel estimation controller compares the determined maximum power position with a position of a previously allocated tap (i.e., a reference position) and, in step 607, determines if the two positions are substantially identical as a result of the comparison, thus determining slewing or non-slewing.

If the maximum power position and the reference position are not substantially identical, in step 609, the channel estimation controller determines slewing performance, performs slewing control such that the maximum power position is consistent with the reference position, and proceeds to step 611 below.

On the other hand, if the maximum power position and the reference position are substantially identical, the channel estimation controller proceeds to step 611 without performing slewing, controls to lock a multi tap, and terminates the operation according to an exemplary embodiment the present invention.

Figure 7:
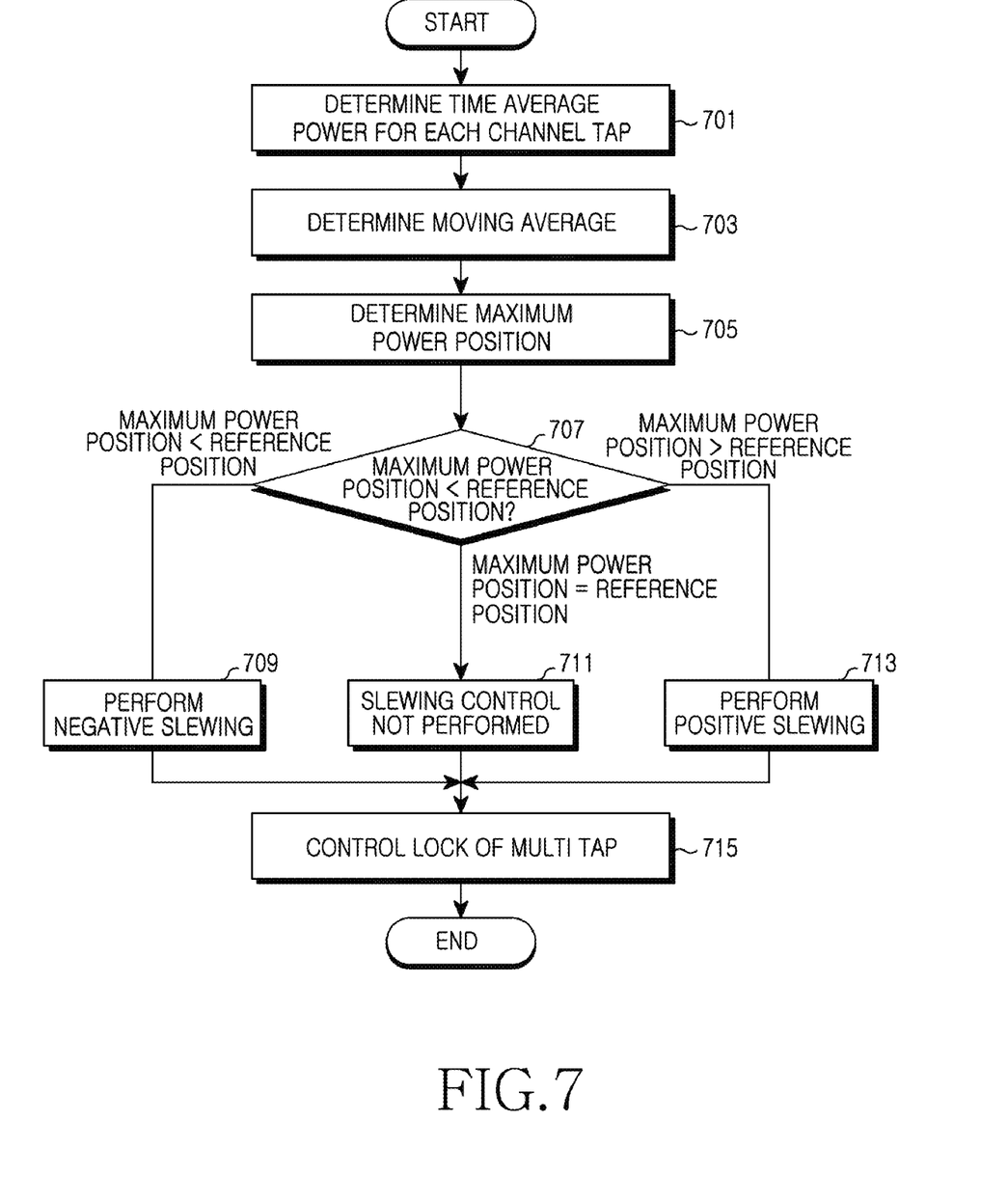
FIG. 7 is a flowchart illustrating a slewing operation procedure using a moving average of a channel estimation controller in a receiver according to an exemplary embodiment of the present invention.

FIG. 7 is a flowchart illustrating a slewing operation procedure using a moving average in a receiver according to an exemplary embodiment of the present invention.

Referring to FIG. 7, in step 701, the receiver determines energy for each multi channel tap, i.e., a time averaging power as given in Equation 1 and, in step 703, analyzes a delay profile of a multi path channel using a moving average technique as given in Equation 5. In step 705, the receiver determines the maximum power position as given in Equation 6.

In step 707, the receiver compares the maximum power position with a reference position.

If the maximum power position is less than the reference position, the receiver proceeds to step 709 and performs negative slewing, if the maximum power position is greater than the reference position, proceeds to step 713 and performs positive slewing and, if the maximum power position and the reference position are substantially identical, proceeds to step 711 wherein slewing is not performed.

In step 715, the receiver controls the locking of a multi tap and then terminates the operation according to an exemplary embodiment the present invention.

Figure 8:
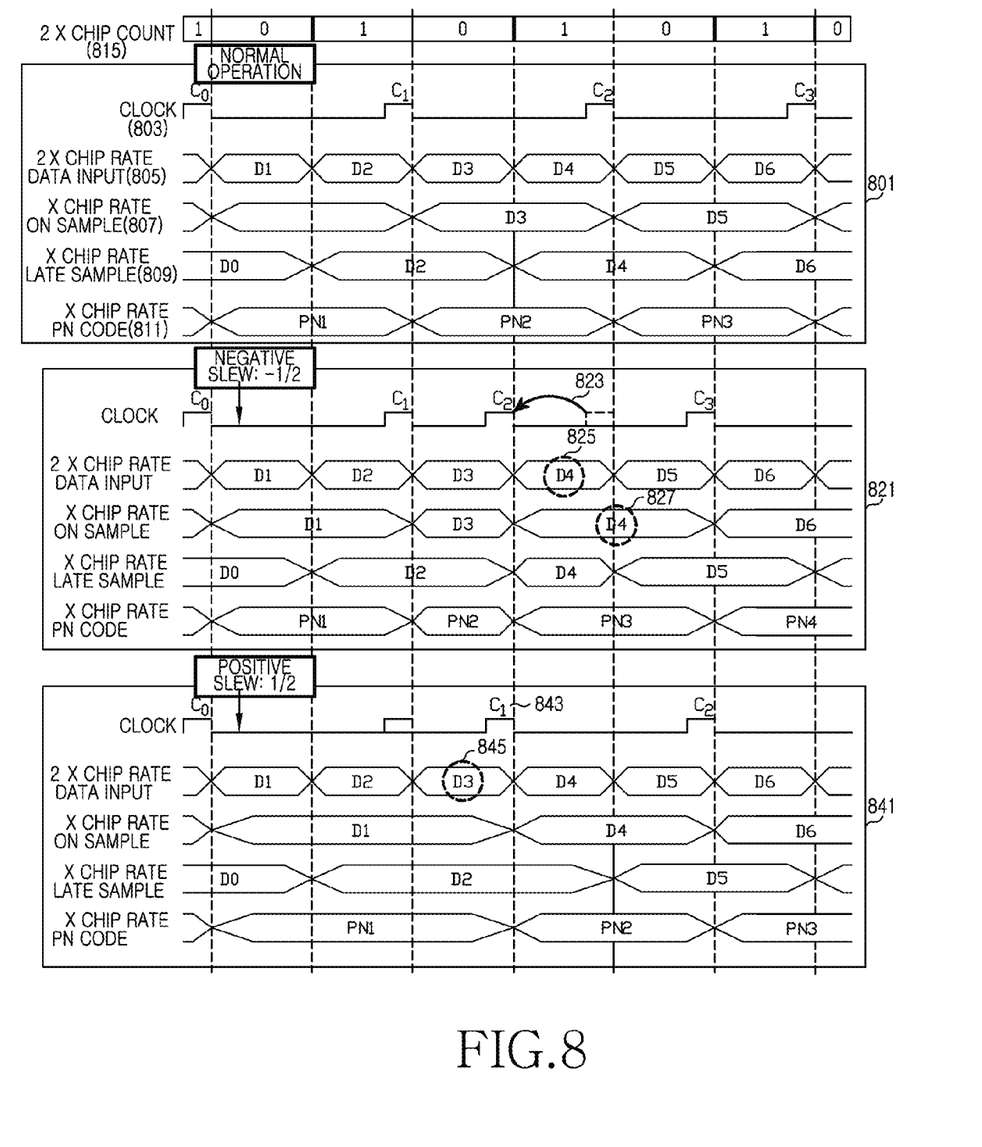
FIG. 8 is a diagram illustrating an example of slewing performance in a receiver according to an exemplary embodiment of the present invention.

FIG. 8 is a diagram illustrating an example of slewing performance in a receiver according to an exemplary embodiment of the present invention.

Referring to FIG. 8, a case of performing a normal operation 801 without performing slewing is described. A clock signal 803 is input with a 2-chip interval and a data signal 805 is input at a 2× chip rate. The data signal 805 of the 2× chip rate is sampled into an on-sample 807 and late-sample 809 having a 1× chip rate. And, a PN code 811 of a 1× chip rate is generated. At this time, a 2× chip count 815 is a variable counting a chip number, wherein '0' represents an on-sample and '1' represents a late-sample. Data signal input applied in the normal operation state is in a sequence of (D1, D2), (D3, D4), (D5, D6), . . . . At this time, a PN code is multiplied in a sequence of PN1, PN2, PN3, . . . .

If negative slewing 821 is performed during a normal operation as described above, a receiver adjusts a clock signal ($C_2$) 823 as early as a half chip through the channel estimation controller 207. If so, D4 825, among the 2× chip rate data signal 805, is once repeated 827 and applied to an on-sample, and a phase of a PN code is adjusted as late as a half chip.

On the other hand, if positive slewing 841 is performed, the receiver adjusts a clock signal ($C_1$) 843 as late as a half chip through the channel estimation controller 207. If so, D3 845, among the 2× chip rate data signal 805, is not sampled, and a phase of a PN code is adjusted as early as a half chip. Here, when the positive slewing is performed, the half chip among the data signals is lost as above. However, in a slewing operation according to an exemplary embodiment of the present invention, two half-chips are not continuously simultaneously lost, and the half chip loss is a loss of a state where a receiver system operates at a 2× chip rate for a signal enough by a 1× chip rate and thus, performance of a channel estimator and equalizer are not deteriorated.

Also, because the on-late sampler 201 repeats and applies a half chip sample or applies one less depending on a clock signal as described above, a size of the chip buffer 205 for generating an output to the equalizer FIR filter 109 increases or decreases by a half chip at the time of the slewing generation. That is, in the normal operation 801 state, an input data signal is applied to the chip buffer 205 in sequence of D1, D2, D3, D4, D5, D6, . . . . However, at the time of negative slewing 821, by once more repeating D4 data and applying the input data signal in sequence of D1, D2, D3, D4, D5, D6, . . . , a size of the chip buffer 205 increases by a half chip. On the other hand, at the time of positive slewing 841, the size of the chip buffer 205 decreases by a half chip because the input data signal is input and applied in sequence of D1, D2, D4, D5, D6 . . . and one value D3 is lost. That is, exemplary embodiments of the present invention have an advantage in that there is no need to change operation timing of a rear end such as an equalizer and a despreading unit by controlling the size of the chip buffer depending on slewing performance.

Figure 9A:
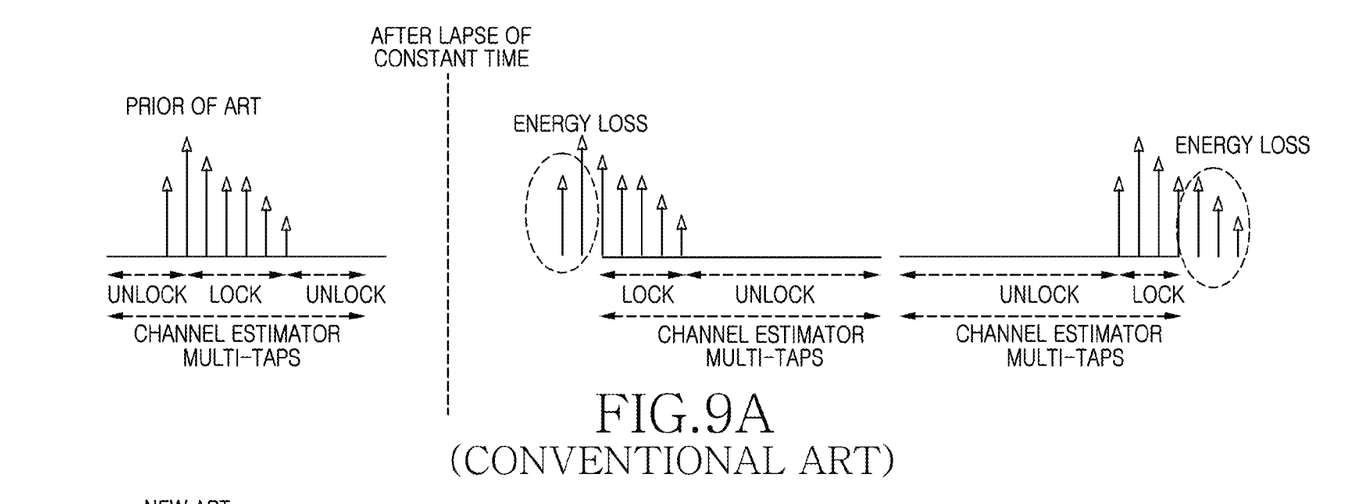
FIGS. 9A and 9B are diagrams illustrating performance of a receiver according to the conventional art and a receiver according to an exemplary embodiment of the present invention.
Figure 9B:
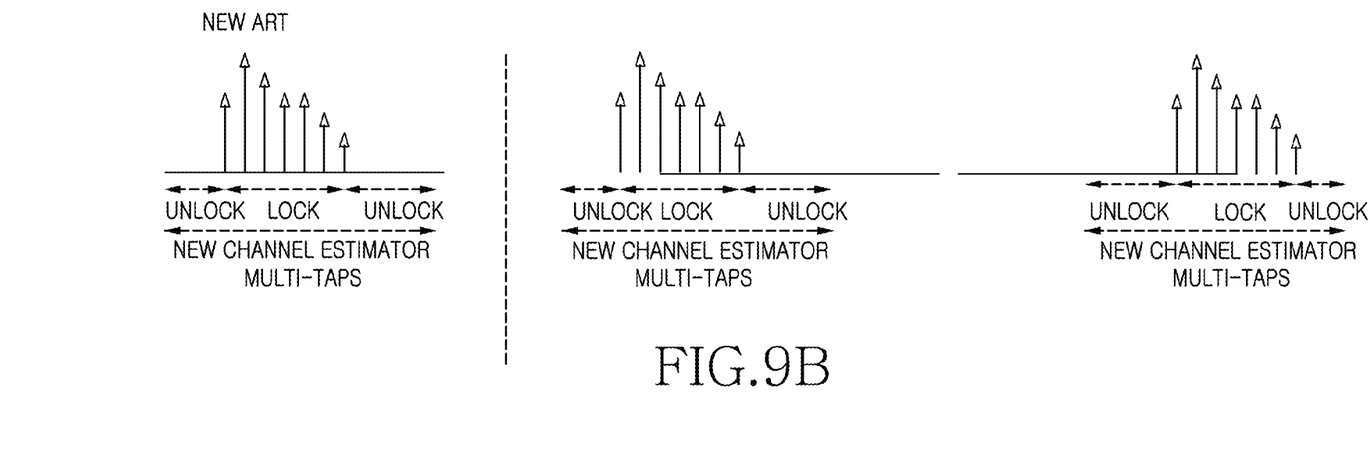

FIGS. 9A and 9B are diagrams illustrating performance of a receiver according to the conventional art and a receiver according to an exemplary embodiment of the present invention.

FIGS. 9A and 9B illustrate circumstances of receiving multi path delay profiles after enough time lapses in receivers according to the conventional art and an exemplary embodiment of the present invention, respectively.

Referring to FIG. 9A, because the conventional receiver locks and uses only a partial tap among a plurality of taps having fixed positions, after enough time lapses, a delay profile of a multi path channel is out of a range of the multi tap and thus performance loss is generated.

On the other hand, as illustrated in FIG. 9B, it may be appreciated that, by moving a position of a multi tap depending on a variation of a multi path channel delay profile through slewing, an exemplary receiver of the present invention may receive all energy of the multi path channel delay profile even after time lapses and thus, a performance loss does not appear.

Exemplary embodiments of the present invention have an effect of, by slewing and adaptively changing an allocation position of a tap used for channel estimation and equalization through a delay profile of a multi path channel and a comparison of an allocated position of a multi tap in a receiver of a mobile communication system, allowing a multi path signal to always be distributed within a range of a receiver multi tap, thus being capable of reducing a loss of reception performance and being capable of reducing hardware complexity of the receiver.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An equalizer based receiver operation method in a mobile communication system, the method comprising:
    estimating a channel for a multi path receive signal;
    analyzing a delay profile of a multi path channel; and
    selecting a tap position from a plurality of tap positions of an equalizer depending on the analyzed delay profile,
    wherein the selecting of the tap position of the equalizer comprises:
        comparing a maximum power position with a preset reference position in the analyzed delay profile;
        selecting a tap position depending on the comparison result; and
        when the tap position is changed, performing slewing that moves a tap by a predefined amount, and
    wherein the changing of the position of the tap depending on the comparison result comprises:
        if the maximum power position and the reference position are substantially identical, determining not to change a position of the tap;
        if the maximum power position is less than the reference position, determining to change the position of the tap through negative slewing; and
        if the maximum power position is greater than the reference position, determining to change the position of the tap through positive slewing.

2. The method of claim 1, wherein the analyzing of the delay profile of the multi path channel comprises:
    acquiring a channel estimation value for each of the plurality of tap positions from the multi path receive signal;
    determining a time average power of each tap;
    determining a moving average of each tap using the time average power; and
    determining a position having the maximum power value using the determined moving average.

3. The method of claim 2, wherein the moving average of each tap is determined as:

$$MA_n(t) = \frac{1}{N_{MA}} \sum_{i=n}^{n+N_{MA}-1} P_n(t)$$

where '$MA_n(t)$' represents a moving average of an n-th channel tap at time 't', '$N_{MA}$' represents a moving average window size for the n-th channel tap at the time 't', and '$P_n(t)$' represents a time average power value for the n-th channel tap.

4. The method of claim 2, wherein the maximum power position is determined using:

$$n_{max}(t) = \underset{n}{\mathrm{argmax}}\, MA_n(t)$$

where '$n_{max}(t)$' represents the maximum power position, and '$MA_n(t)$' represents a moving average of an n-th channel tap at time 't'.

5. The method of claim 1, wherein the predefined amount consists of one half chip.

6. The method of claim 1, wherein the slewing is performed by controlling a sampling position of an input signal and a clock position of a Pseudo-random Noise (PN) signal.

7. An equalizer based receiver apparatus in a mobile communication system, the apparatus comprising:
a channel estimator for estimating a channel for a multi path receive signal, for analyzing a delay profile of a multi path channel, and for selecting a tap position from a plurality of tap positions depending on the analyzed delay profile; and
an equalizer for compensating a distortion of the multi path receive signal using a tap of the changed position,
wherein the channel estimator comprises a slewing controller for comparing a maximum power position with a preset reference position in the analyzed delay profile, for selecting a position of the tap depending on the comparison result and, when the tap position is changed, slewing a multi tap by a predefined amount, and
wherein, if the maximum power position and the reference position are substantially identical as the comparison result, the channel estimator determines not to change a position of a multi tap, if the maximum power position is less than the reference position, determines to change the position of the multi tap through negative slewing and, if the maximum power position is greater than the reference position, determines to change the position of the multi tap through positive slewing.

8. The apparatus of claim 7, wherein the channel estimator comprises:
a multi tap subchannel estimator for acquiring a channel estimation value of each tap from the multi path receive signal; and
a channel estimation controller for determining a time average power of each tap and a moving average of each tap using the channel estimation value of each tap, and for determining a position having the maximum power value using the determined moving average.

9. The apparatus of claim 8, wherein the channel estimation controller determines the moving average of each tap as:

$$MA_n(t) = \frac{1}{N_{MA}} \sum_{i=n}^{n+N_{MA}-1} P_n(t)$$

where '$MA_n(t)$' represents a moving average of an n-th channel tap at time 't', '$N_{MA}$' represents a moving average window size for the n-th channel tap at the time 't', and '$P_n(t)$' represents a time average power value for the n-th channel tap.

10. The apparatus of claim 8, wherein the channel estimation controller determines the maximum power position using:

$$n_{max}(t) = \underset{n}{\mathrm{argmax}}\, MA_n(t)$$

where '$n_{max}(t)$' represents the maximum power position, and '$MA_n(t)$' represents a moving average of an n-th channel tap at time 't'.

11. The apparatus of claim 7, wherein the predefined amount consists of one half chip.

12. The apparatus of claim 7, wherein the channel estimator further comprises:
an on-late sampler for sampling a data signal into an on-sample and a late-sample, and for adjusting a sampling position of the on-sample and late-sample depending on control of the slewing controller; and
a Pseudo-random Noise (PN) generator for controlling a clock of a PN signal depending on the control of the slewing controller.

* * * * *